United States Patent [19]
Kato et al.

[11] Patent Number: 5,627,920
[45] Date of Patent: May 6, 1997

[54] OPTICAL-OPTICAL MODULATORS

[75] Inventors: Naohiko Kato, Nisshin; Tadashi Ichikawa, Nagoya; Hiroshi Ito, Kasugai; Tomoyoshi Motohiro, Seto; Tatsumi Hioki, Nagoya, all of Japan

[73] Assignee: Kabushiki Kaisha Toyota Chuo Kenkyusho, Aichi-ken, Japan

[21] Appl. No.: 446,308

[22] Filed: May 22, 1995

[30] Foreign Application Priority Data

May 23, 1994 [JP] Japan .................................. 6-133688

[51] Int. Cl.⁶ ...................................................... G02B 6/10
[52] U.S. Cl. ............................................................ 385/2
[58] Field of Search ................................. 359/245, 246, 359/247; 385/1–10

[56] References Cited

U.S. PATENT DOCUMENTS 4,674,827  6/1987  Izutsu et al. ...................... 350/96.12
5,315,422  5/1994  Utaka et al. ........................... 385/3

FOREIGN PATENT DOCUMENTS 60-44647  10/1985  Japan .

OTHER PUBLICATIONS

Yajima et al., "Optical–Optical Guided–Wave Modulator," Appl. Phys. Lett., vol. 45 No. 3, Aug. 1984, pp. 214–216.

Primary Examiner—John Ngo
Attorney, Agent, or Firm—Oblon, Spivak, McClelland, Maier & Neustadt, P.C.

[57] ABSTRACT

An optical-optical modulator (10) has a substrate (1) made of Zcut-LiNbO$_3$ and a Ti-diffused waveguide (2) thereon. The waveguide (2) is separated into two branches which merge later into one again and constitute the Mach-Zehnder interferometer. A pair of electrodes (3a, 3b) for phase modulation is formed on a modulation part (A) which is in the middle of the waveguide (2). A CdS$_x$Te$_{1-x}$ photoelectric conversion film (6) is formed directly contacting the pair of electrodes (3a, 3b). The photoelectric film (6) is manufactured by oblique vapor deposition utilizing CdS and CdTe as two vapor deposition sources. When the photoelectric conversion film 6 receives a control light (Lc), the film (6) generates voltage. The generated voltage is applied to the pair of electrodes (3a, 3b) and becomes a modulation signal of the carrier light (La).

6 Claims, 8 Drawing Sheets

FIG. 8

| OPTICAL-OPTICAL MODULATOR | | PHOTOVOLTAIC MODULATION LAYER | RESPONSE TIME | PROBLEM |
|---|---|---|---|---|
| CONVENTIONAL MODULATOR | A TYPE | SEMICONDUCTOR MATERIAL FABRICATED BY OBLIQUE VAPOR DEPOSITION | 1 min | SLOW RESPONSE TIME |
| | B TYPE | NON-CRYSTALLINE Si-CELLS INTEGRATED IN SERIES ON A LINE | 5 $\mu$sec | NOT SENSITIVE IN NEAR-INFRARED REGION |
| MODULATOR IN THE PRESENT INVENTION | | A MIXED MATERIAL OF A SEMICONDCUTOR AND A CONDUCTIVE MATERIALS eg. CdS-CdTe FILM FABRICATED BY OBLIQUE VAPOR DEPOSITION | 0.1 sec | NONE |

FIG. 9

| | RESISTIVITY ($\Omega$cm) | PHOTOVOLTAGE (V) | RESPONSE TIME (sec.) |
|---|---|---|---|
| CdTe OBLIQUE VAPOR DEPOSITION FILM | $3 * 10^7$ | 100 | 120 |
| CdS-CdTe OBLIQUE VAPOR DEPOSITION FILM | $5 * 10^3$ | 3.0 | <0.1 |

FIG. 10

| COMPOSITION RATIO (x) | PHOTOVOLTAGE (V) | RESISTIVITY ($\Omega$cm) | RESPONSE TIME (sec) |
|---|---|---|---|
| 0.29 | 200 | $2.5 * 10^7$ | 120 |
| 0.33 | 56 | $4.5 * 10^6$ | 60 |
| 0.40 | 40 | $4.0 * 10^6$ | 20 |
| 0.51 | 10 | $3.5 * 10^5$ | 3 |
| 0.57 | 5.0 | $4.5 * 10^4$ | 0.1 |
| 0.60 | 2.5 | $5.0 * 10^3$ | 0.05 |
| 0.67 | 0.2 | $2.0 * 10^3$ | 0.01 |
| 0.75 | 0.01 | $1.0 * 10^3$ | 0.01 |
| 0.81 | 0.001 | 200 | 0.01 |

OPTICAL-OPTICAL MODULATORS

BACKGROUND OF THE INVENTION

1. Field of the invention

The present invention relates to an optical-optical modulator in a broad sense that directly modulates intensity of external light by a light signal. The optical-optical modulator of the present invention includes an optical intensity modulator, an optical amplifier, an optical analog/digital convertor and so on.

2. Description of the Related Art

Optical-optical modulators

The optical-optical modulator utilizes light as a carrier wave and a control signal, i.e. a modulation signal. The modulator is constituted both by an electro-optic device whose optical properties are altered by electric field and by an photovoltaic device which generates voltage by light power. Two representative optical-optical modulators are differentiated in their constitution described below.

A type

The optical-optical modulator of A type disclosed Japanese Patent Publication No. Sho 60-44647 is constituted both by an electro-optic device of directional coupler type and by an anomalous photovoltaic device which generates dozens of voltages made of semiconductor film of CdTe, GaAs, Si and so on fabricated by oblique vapor deposition.

B type

The optical-optical modulator of B type disclosed Applied Physics Letter (Vol.45, No.3, pp 214 to 216, 1984) is constituted both by an electro-optic modulator of Maeh-Zehnder type and by an integrated photovoltaic device of amorphous silicon cells. The saturation voltage of each cell is around 0.8 V and each cell is arranged in series.

The A type optical-optical modulator has advantages of requiring small amount of intensity of the control light which is incident into the photovoltaic device and enabling to utilize semiconductor laser light around the near-infrared region in which transmission loss optical fiber is a little. However, switching time, or especially the breaking time of an optical control switch, is slow taking several minutes since inner resistivity of the photovoltaic device is high. When CdTe, GaAs, and so on are utilized for the photovoltaic device, its fall time takes several minutes in contrast to its quick rise time taking a few seconds.

On the contrary to the A type modulator, the B type optical-optical modulator is characterized by its quick response time of micro-second. However, two problems exist in the B type optical-optical modulator. First, photovoltaic energy of the Si battery is weak. Since each cell of the Si solar batteries generates just around 0.8 V photovoltage, dozens of the batteries have to be integrated by being connected in series for enough voltage. Consequently, the manufacturing process of the B type modulator becomes complex requiring integration process of the Si batteries. Second, sensitivity of the amorphous Si solar battery is not enough. Since the Si battery is not sensitive to the light of near-infrared region which is 700 nm or more, the B type modulator cannot detect the light with wavelength of 830 nm which is widely used as the light of a laser diode and whose transmission loss is smaller in an optical fiber cable.

Optical-optica A/D convertor

An optical-optical A/D converter is theoretically possible utilizing the optical-bistable device. Since the output light of the optical-bistable device alters in grade depending on increase of optical input intensity, utilizing that characteristic will be able to convert an analogous optical input signal into a digital output signal. However, the threshold value of the optical input intensity for modulation in digit is quite large at the present technological level, so that characteristic is impossible to be obtained within the range of ordinary light intensity. Consequently, the optical-optical A/D converter is not realized yet.

SUMMARY OF THE INVENTION

It is an object of the present invention to solve the above problems by improving response time of the optical-optical modulator.

It is another object of the present invention to realize the optical optical A/D convertor which generates optical pulse signals corresponding to intensity of analog optical signal even if the intensity is small.

It is further object of the present invention to modulate an incoherent light distributed over one dimension into a coherent light with larger amplitude.

According to the first aspect of the invention, there is provided an optical modulator comprising:

a substrate;

a waveguide formed on the substrate for guiding a carrier light;

a modulation part having electro-optic effects for modulating the carrier light, being a part of the waveguide;

a pair of electrodes disposed in said modulation part for applying electric field to the modulation part; and a photoelectric conversion film formed on the substrate for receiving a control light, converting the control light into an electro-control signal, and applying the electro-control signal to the pair of electrodes, the photoelectric conversion film being made of a mixed substance of a semiconductor material with photoelectric effects and a conductive material.

According to the second aspect of the invention, the photoelectric conversion film is made of a substance having the formula $CdS_xTe_{1-x}$ wherein $0.4<x<0.7$.

According to the third aspect of the invention, the photoelectric conversion film is formed by oblique vapor deposition utilizing CdS and CdTe as two vapor deposition sources.

According to the fourth aspect of the invention, optical analog to digital conversion is realized by defining pulse number of an optical pulse series signal as an amplitude value of the control light, having characteristics that intensity of the carrier light modulated at the modulation part alters periodically in sine wave depending on increase of the electric field applied to the modulation part, and that the fluctuating number of the intensity of the modulation carrier light which alters periodically is defined as the digital value of the intensity of the control light when the control light is irradiated to the photoelectric conversion film, or when the irradiation is stopped as a transient period.

According to the fifth aspect of the invention, there is provided another optical-optical modulation device which amplifies light with one dimensional distribution or converts the light with one dimensional distribution into the light of pulse column distributed in one dimension, and converts the incoherent ordinary light into coherent light. Namely, the optical-optical modulation device of the fifth aspect is characterized by arranging plural optical-optical modulation devices of the first aspect on a line;

3 utilizing an incoherent light with one dimensional distribution towards the line as the control light; and utilizing a coherent light as the carrier light.

The constitution described in the first aspect of the invention enables the inner resistivity of the conversion film to be minimized. Accordingly, the response characteristic of the photovoltage to the control signal is shortened. Consequently, the response characteristic of the modulated carrier light to the control light is improved.

The constitution described in the second and third aspects of the invention enables to utilize a laser light of a semiconductor laser diode with wavelength of around 830 nm in near-infrared region where a transmission loss of fiber is smaller.

The constitution described in the fourth and fifth aspects of the invention enables response time to be high-speed realizing an optical A/D converter and an optical amplifier. Consequently, even an input of a small luminous intensity of the analog signal can realize the optical A/D conversion.

Other objects, features, and characteristics of the present invention will become apparent upon consideration of the following description in the appended claims with reference to the accompanying drawings, all of which form a part of the specification, and wherein referenced numerals designate corresponding parts in the various figures.

BRIEF DESCRIPTION OF THE DRAWING

In the accompanying drawings:

FIG. 8 is a table comparing time response and characteristic figures of the optical-optical modulator of the present invention and those of the prior art;

FIG. 9 is a table comparing response time, resistivity, and photovoltage of the photoelectric conversion film on the optical-optical modulator of the present invention and those of the prior art; and FIG. 10 is a table of photovoltage, resistivity, and response time depending on composition ratio x of the $CdS_xTe_{1-x}$ photoelectric conversion film of the optical-optical modulator of the present invention.

DETAILED DESCRIPTION OF THE PREFERRED EMBODIMENT

The invention will be more fully understood by reference to the following examples.

4

EXAMPLE 1

The first embodiment relates to an optical-optical modulator which modulates intensity of carrier light by intensity of a control light.

Figure 1:
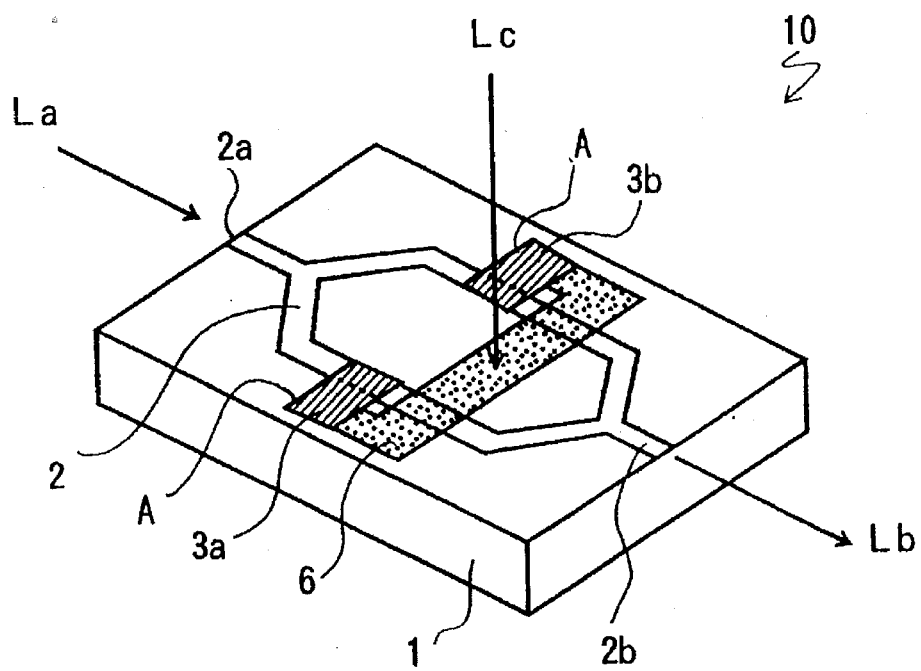
FIG. 1 is a perspective view showing the structure of the optical-optical modulator in Example 1.

FIG. 1 shows the structure of an optical-optical modulator 10. A substrate 1 is made of Zcut-LiNbO$_3$. A Ti diffused waveguide 2 is formed on the surface of the substrate 1. The waveguide 2 is a single path at the side of an input terminal 2a, branched in the middle in Y-shape, and joined again at the side of an output terminal 2b. The structure of the waveguide 2 is as same as that of a conventional Mach-Zehnder type interferometer.

A pair of electrodes 3a and 3b for phase modulation is formed on a modulation part A at the middle of the waveguide 2. Further, a $CdS_xTe_{1-x}$ photoelectric conversion film 6 directly contacting the electrodes 3a and 3b is formed by oblique vapor deposition utilizing CdS and CdTe as two vapor deposition sources. The photoelectric conversion film 6 generates voltage when it receives a control light Lc. The generated voltage is applied to the electrodes 3a and 3b, and becomes a modulation signal to a carrier light La.

The photoelectric conversion film 6 was formed as follows. Two different materials, or CdS and CdTe, were utilized as targets, which were tilted by 30 to 80 degree from the normal surface of the substrate 1 in symmetrical arrangement to the normal surface. Oblique sputtering is carried out to the targets, simultaneously so as to form the film 6.

The principle of the optical modulation is described below.

The carrier light La is input from an input terminal 2a of the waveguide 2 and separated into two branches which are led to the modulation part A. Applying voltage to the electrodes 3a and 3b produces a phase difference between the two separated carrier lights moving in each of the branches, because of an electro-optic effect. The two branches are combined into one at an output terminal 2b of the waveguide 2 and output as a modulated carrier light Lb Since the modulated carrier light Lb is made of the two lights with different phases, its intensity is altered in sine wave depending on phase shifting amount which is controllable by the amount of the applied voltage to the electrodes 3a and 3b. The amount of the applied voltage increases in proportion to the intensity of a control light Lc which is incided into the photoelectric conversion film 6.

Figure 2:
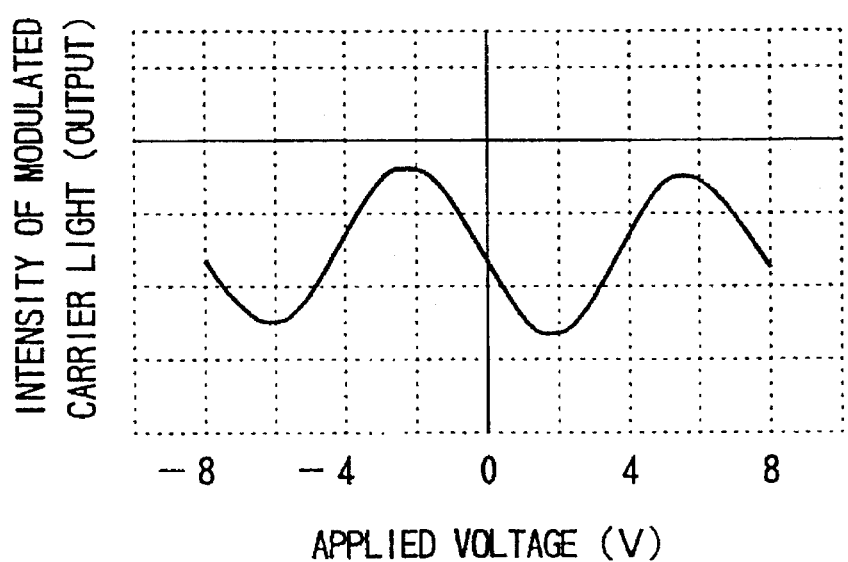
FIG. 2 is a characteristic figure showing a dependence of the intensity of the output modulated carrier light on the voltage applied to modulation part of the optical modulator.

FIG. 2 shows an optical modulation characteristic of the optical modulator 10 when DC voltage is applied to the modulation part A. The axis of abscissas exhibits applied voltage and that of ordinates does intensity of the modulated carrier light Lb. As shown in FIG. 2, about 2 to 4 V voltage is enough to obtain maximum modulation degree by the optical-optical modulator 10. Therefore, necessary luminous intensity for the control light Lc may be so small as to generate the voltage for the maximum modulation degree. Further, FIG. 2 shows that the intensity of the modulated carrier light Lb alters in sine wave in proportion to the applied voltage.

FIG. 8 compares the response time of the optical-optical modulators of A and B types in the prior art with that of the optical-optical modulator in the present invention. FIG. 8 tells that the photoelectric conversion film 6, or the photovoltaic layer, of the present invention is highly sensitive and responsive to the light of a semiconductor laser with the near-*infrared wavelength whose intensity is low.

Then, FIG. 9 compares the photoelectric conversion film 6 made of the single substance of CdTe with that made of a mixed substance of CdTe and CdS in terms of the resistivity, the photovoltaic voltage, and the response time. FIG. 9 tells that the photoelectric conversion film made of the mixed substance has smaller resistivity by four orders and responds faster by three orders than the film made of the single substance.

The composition ratio x of the $CdS_xTe_{1-x}$ photoelectric conversion film 6 can be altered by controlling applied voltage to the targets of CdTe and CdS. FIG. 10 shows a measured relationship between the values x and the values of photovoltage, resistivity, and the response time.

FIG. 10 tells optimum values x for response time and photovoltage. For generic application of the modulation device, the preferable range of the value x is $0.51<x<0.67$ Since the value x of 0.57 or larger is preferable for 0.1 sec. or faster response time and 0.67 or smaller is for 0.2 V or more photovoltage, the most desirable range of the value x considering the response time and the photovoltage is $0.57 \leq x \leq 0.67$. When the response time is more emphasized than photovoltage, the most preferable range of the value x is $0.6 \leq x \leq 0.67$. When the photoelectric conversion film 6 is utilized for an optical A/D convertor, larger photovoltage is preferable. Accordingly, the optimum range of the value x for that application is $0.4<x<0.7$.

Figure 3:
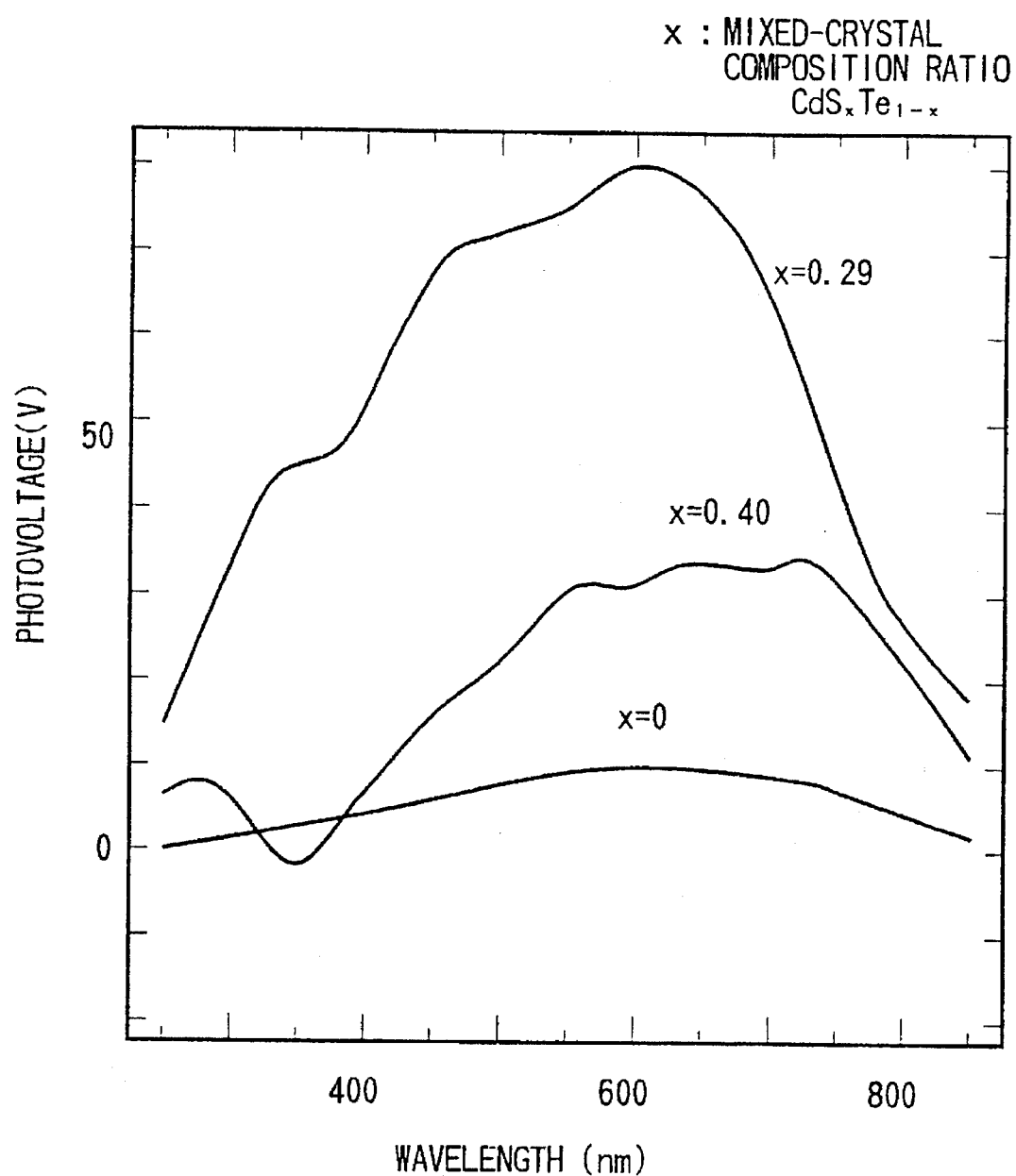
FIG. 3 is a characteristic figure exhibiting a dependence of the photovoltage generated by the photoelectric conversion film on the wavelength of the control light incided into the photoelectric conversion film of the optical-optical modulator.

FIG. 3 shows the relation between the wavelength of incident ray and the photovoltage when the value x of the composition ratio of the $CdS_xTe_{1-x}$ film 6 is altered at 0.29.0.40, and 0. FIG. 3 tells that the film 6 made of the material $CdS_xTe_{1-x}$ is sensitive to light in the near-infrared region, so that the optical-optical modulator with the film 6 can utilize the light of a semiconductor laser in that region as the control light, which is frequently employed in an optical circuit because of its lesser requirement of the output power.

The photoelectric conversion film 6 is manufactured by oblique vapor deposition using CdTe and CdS as the two sources. Alternatively, the film 6 can be manufactured by vapor deposition using $CdS_xTe_{1-x}$ as a single source. Further, alternatively, a ternary semiconductor of Cd, Te and S or a mixture of CdTe and CdS can be used as the source.

The photoelectric conversion film 6 is made of $CdS_xTe_{1-x}$. Alternatively, it can be made of the mixture of one of the photovoltaic semiconductor material including CdTe, GaAs, Si, Ge, PbS, ZnSe, ZnS, InP, HgTe, $Sb_2S_3$ and so on, and one of the conductive material including CdS, $In_2O_3$, $SnO_3$, $In_2O_3+SnO_2$(ITO), metals such as Au and Ag, and so on. Further, alternatively, the compound of any constituents of the above-described materials can be used. When the compound is used, the film 6 can be manufactured by the oblique vapor deposition utilizing two sources, too.

The above-described materials are advantageous in terms of the response time and the manufacturing process. The photoelectric conversion film 6 made of these materials is responsive to a light, because inner resistivity of the conversion film 6 is smaller than that of a conventional film made of a single substance, and these materials generate anomalous photovoltage at small amount of radiation of light. Further, manufacturing process is simplified, because proper selection of the composition ratio of those materials enables to generate large photovoltage and integration of several photoelectric devices carried out to manufacture the conventional B type optical-optical modulator is no longer required.

EXAMPLE 2

Example 2 relates to an optical A/D convertor utilizing the optical-optical modulator 10 in Example 1. The constitution of the convertor is as same as that described in FIG. 1.

The operation of the optical A/D convertor is explained hereinafter.

Figure 4A:
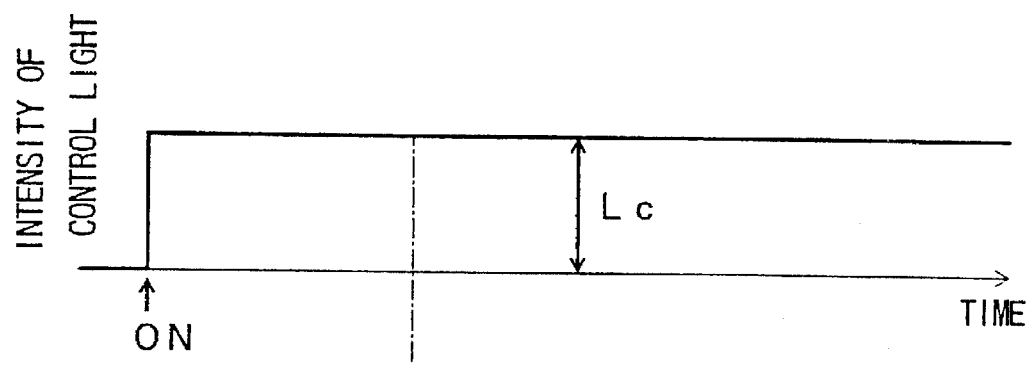
FIGS. 4A to 4C are characteristic figures explaining the operation of the optical-optical A/D convertor in Example 2.
Figure 4B:
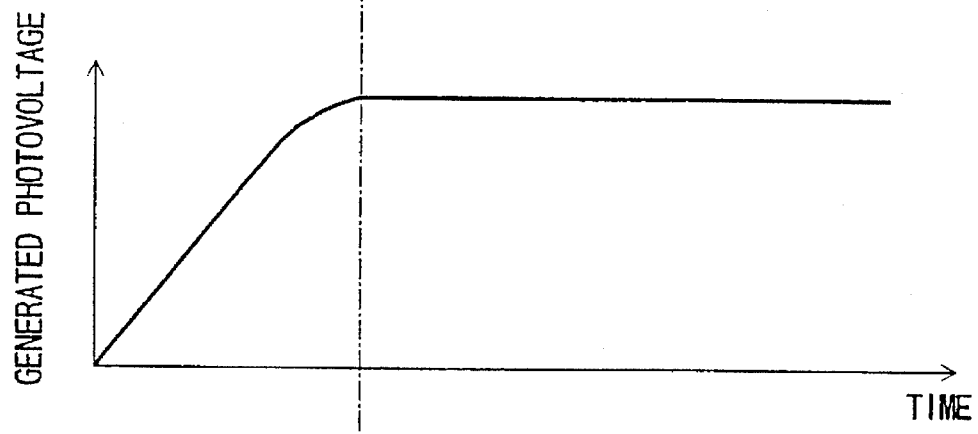
Figure 4C:
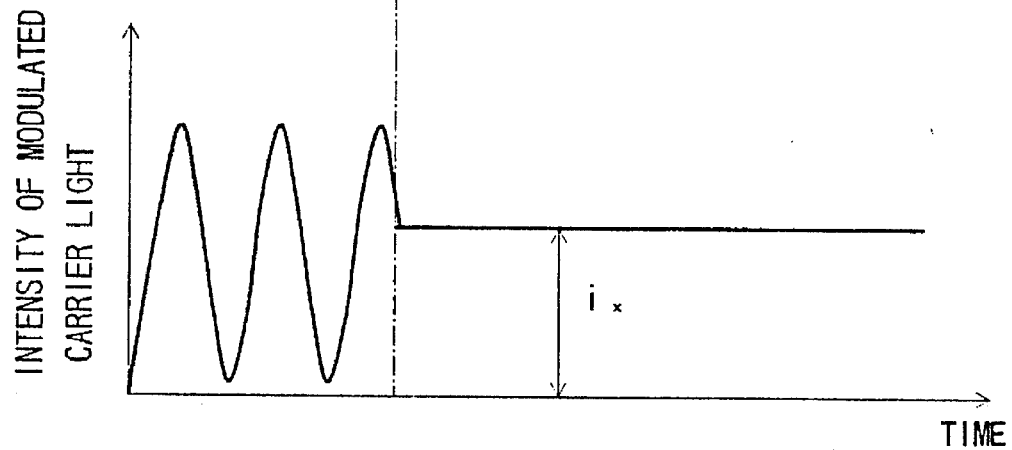

When the control light Lc of step pulse which keeps a constant intensity as shown in FIG. 4A is incided into the optical-optical modulator 10, the intensity of the modulated carrier light Lb which is output from the optical-optical modulator 10 altered in sine wave depending on increase of generated photovoltaic voltage as shown in FIG. 4B. Accordingly, the intensity of the modulated carrier light Lb alters in sine wave and then, keeps a constant value as shown in FIG. 4C.

The peak number of the modulated carrier light Lb which altered in sine wave is equal to digital values of intensity of the control light Lc. Thereby, the control light Lc is converted into serial pulses corresponding to the peak number. The quantization unit of the conversion is a voltage width which is able to shift the phase of a wavelength. When counting one pulse in the respective maximum and minimum values, the quantization unit is a voltage width which is able to shift the phase of half a wavelength.

Figure 5:
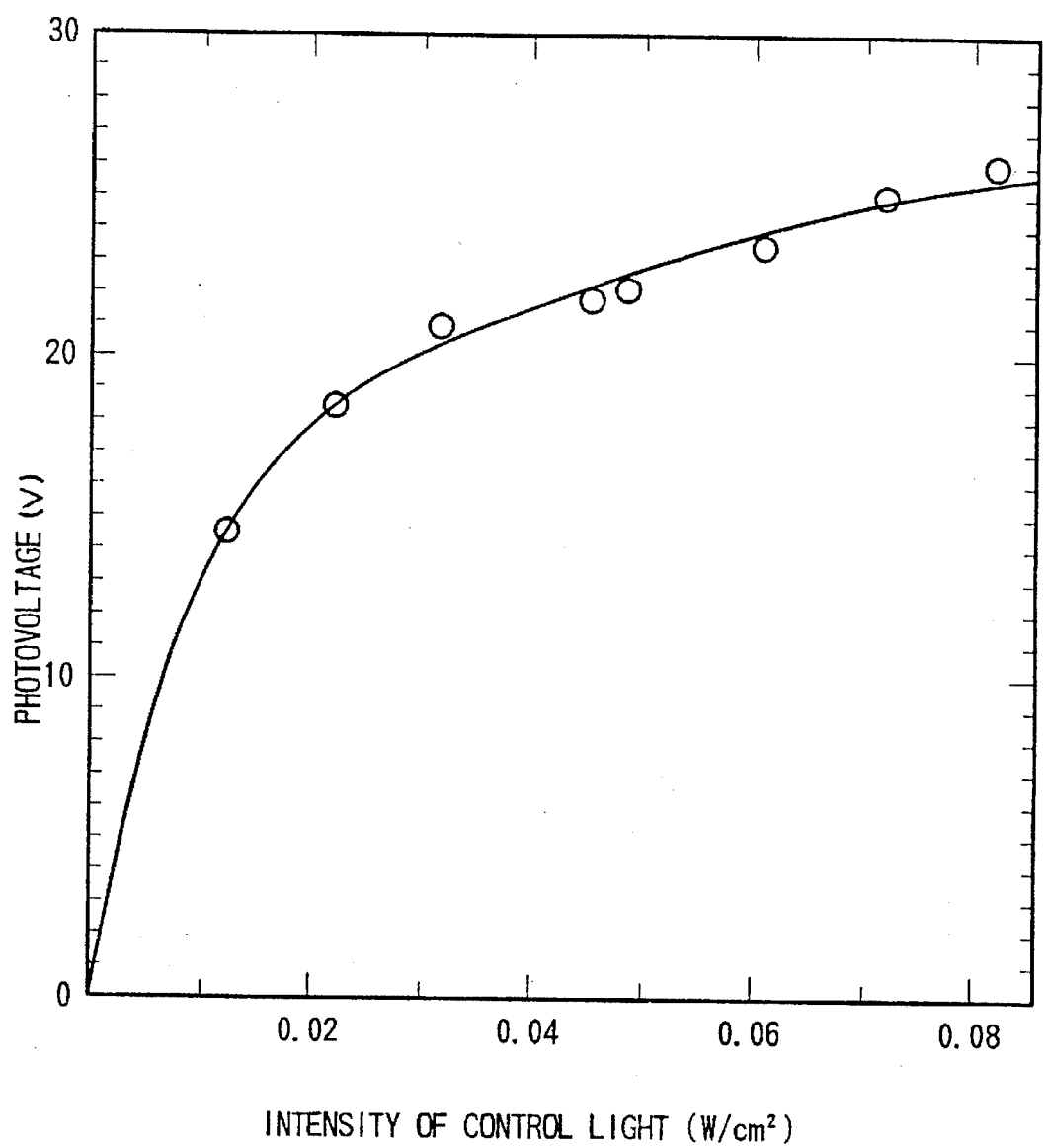
FIG. 5 is a characteristic figure exhibiting dependence of the photovoltage generated by the photoelectric conversion film in Example 2 on the intensity of the control light incided into the photoelectric conversion film of the optical-optical A/D convertor.

FIG. 5 shows a relation between the intensity of the control light for the photoelectric conversion film 6 of the modulator 10 in Example 2 and the photovoltage generated thereby. The photovoltage increases in accordance with the intensity of control light Lc, so that the number of peak intensity of the modulated carrier light Lb shown in FIG. 4C alters depending on the intensity of the control light Lc.

The optical A/D converter of the present invention is advantageous in efficiency. Although the conventional optical A/D convertor utilizing an optical-bistable device requires high quantity of analog light about b 10;to 20 $W/cm^2$ so as to convert an input signal light into a digital signal, the optical A/D convertor of the present invention does about 0.1 $W/cm^2$ or less.

EXAMPLE 3

Figure 6:
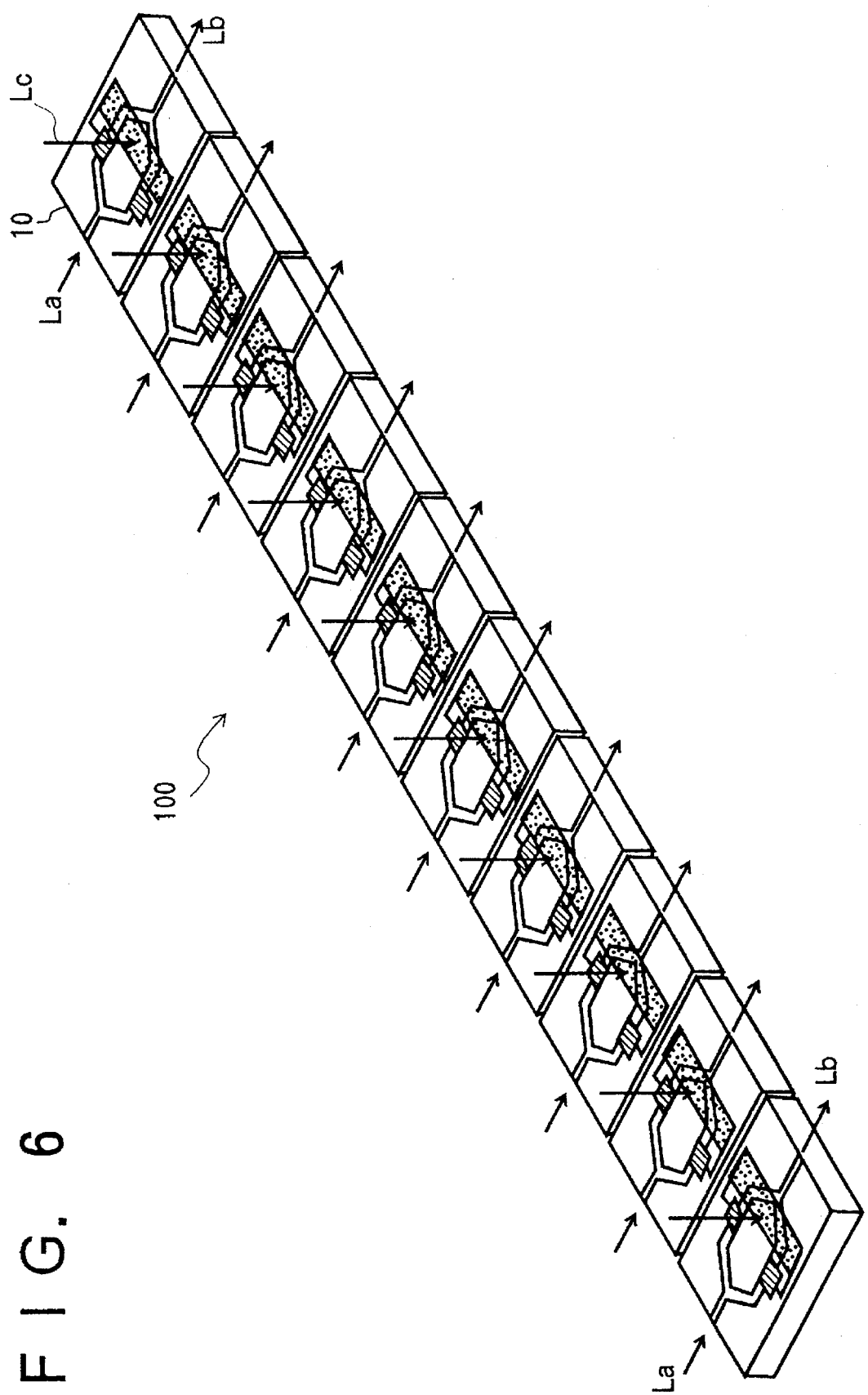
FIG. 6 is a perspective view exhibiting the structure of the optical-optical modulator in Example 3.

As shown in FIG. 6, Example 3 relates to an optical-optical modulator 100 which amplifies light with one dimensional distribution or carries out A/D conversion.

Figure 7:
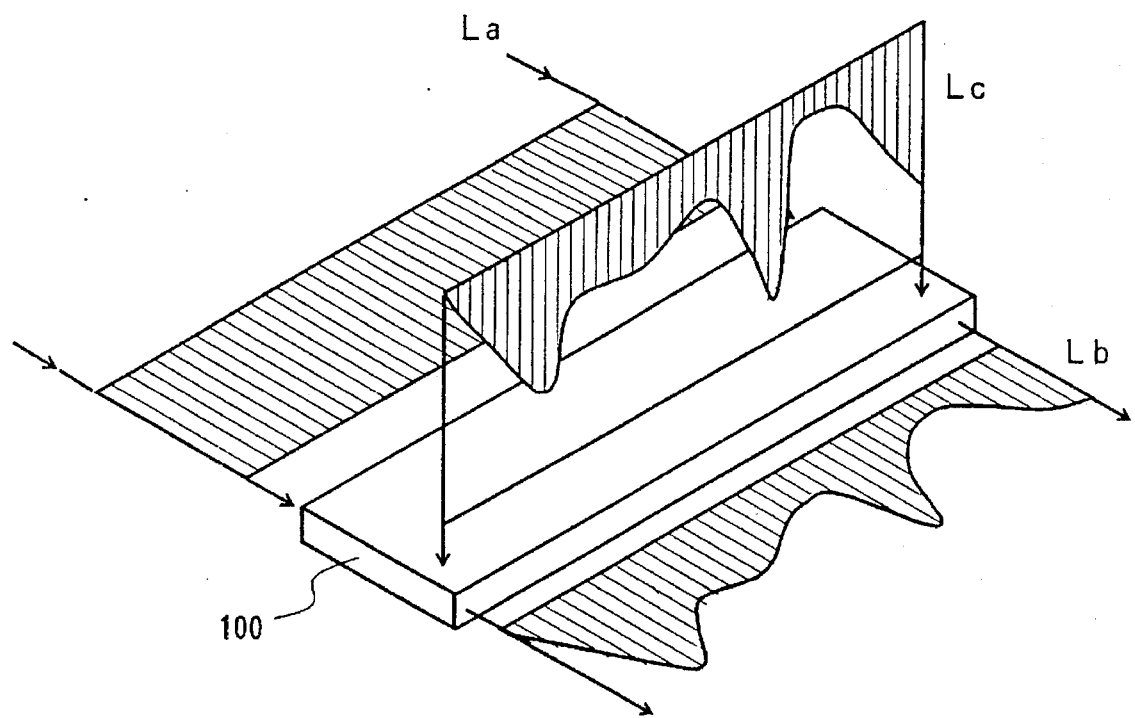
FIG. 7 is a characteristic figure explaining the structure and operation of the optical-optical modulator in Example 3.

The modulator 100 is constituted by plural optical-optical modulator 10 in Example 1 connected in series on a line. Coherent laser light is used for the carrier light La and incoherent normal light is for control light Lc. This optical modulator 100 enables to convert the control light Lc with one dimensional distribution into the coherent modulated carrier light Lb with one dimensional distribution as shown in FIG. 7.

When the modulator 100 is utilized within half a period of FIG. 2, the modulator 100 can be applied to the optical amplifier and the analog optical modulator for the light with one dimensional distribution. When the modulator 100 is utilized in the multi-period as shown in FIG. 2, the modulator 100 can be applied to the optical A/D convertor as described in Example 2.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An optical-optical modulation device comprising:
   a substrate;
   a waveguide formed on said substrate for guiding a carrier light;

a modulation part having electro-optic effects for modulating said carrier light, being a part of said waveguide;

a pair of electrodes disposed in said modulation part for applying electric field to said modulation part; and a photoelectric conversion film formed on said substrate for receiving a control light, converting said control light into an electro-control signal, and applying said electro-control signal to said pair of electrodes, said photoelectric conversion film being made of a mixed substance of a semiconductor material with anomalous photovoltaic effects and a conductive material.

2. An optical-optical modulation device of claim 1 wherein said photoelectric conversion film is made of a substance having a formula $CdS_xTe_{1-x}$ wherein $0.4<x<0.7$.

3. An optical-optical modulation device of claim 2, wherein said photoelectric conversion film is formed by oblique vapor deposition utilizing CdS and CdTe as two vapor deposition sources.

4. An optical-optical modulation device of claim 1, wherein said modulation part modulates said carrier light so that intensity of said carrier light alters periodically in sine wave depending on increase of said electric field applied to said modulation part and said control light is converted into an optical pulse series signal whose pulse number is defined as a digital value of intensity of said control light, said pulse number being equal to a number of a maximum or minimum value appeared during transient period when said control light rises or falls.

5. An optical-optical modulation device of claim 3, wherein said modulation part modulates said carrier light so that intensity of said carrier light alters periodically in sine wave depending on increase of said electric field applied to said modulation part and said control light is converted into an optical pulse series signal whose pulse number is defined as a digital value of intensity of said control light, said pulse number being equal to a number of a maximum or minimum value appeared during transient period when said control light rises or falls.

6. An optical-optical modulation device of claim 1, comprising a plurality of said optical-optical modulation devices arranged in a linear direction for converting an incoherent light with one dimensional distribution into a coherent light with one dimensional distribution, wherein said control light is an incoherent light with one dimensional distribution towards said linear direction and said carrier light is a coherent light.

* * * * *